(12) United States Patent
Breslau et al.

(10) Patent No.: US 8,351,147 B2
(45) Date of Patent: Jan. 8, 2013

(54) DATA STORAGE

(75) Inventors: Franklin Charles Breslau, Teaneck, NJ (US); Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/433,823

(22) Filed: Mar. 29, 2012

(65) Prior Publication Data

US 2012/0182848 A1    Jul. 19, 2012

Related U.S. Application Data

(63) Continuation of application No. 12/370,672, filed on Feb. 13, 2009.

(51) Int. Cl.
 *G11B 5/00*    (2006.01)

(52) U.S. Cl. ...... 360/75; 369/44.19; 360/64; 360/241.1; 360/281

(58) Field of Classification Search ............... 369/44.19; 360/63, 64, 266.2, 270, 281, 246.6, 75, 241.1, 360/241.2
See application file for complete search history.

(56) References Cited

U.S. PATENT DOCUMENTS

| | | | |
|---|---|---|---|
| 5,343,345 A | 8/1994 | Gilovich | |
| 5,610,808 A * | 3/1997 | Squires et al. | 700/2 |
| 5,729,408 A * | 3/1998 | Kikitsu | 360/294.7 |
| 5,901,019 A | 5/1999 | Bucska et al. | |
| 5,983,485 A | 11/1999 | Misso | |
| 6,121,742 A | 9/2000 | Misso | |
| 6,496,326 B1 * | 12/2002 | Boutaghou | 360/99.17 |
| 6,775,080 B2 * | 8/2004 | King et al. | 360/48 |
| 6,895,500 B1 * | 5/2005 | Rothberg | 713/1 |
| 7,102,842 B1 | 9/2006 | Howard | |
| 7,324,301 B2 | 1/2008 | Tormasi | |
| 2002/0057512 A1 * | 5/2002 | Chung et al. | 360/67 |
| 2005/0207067 A1 * | 9/2005 | Zabtcioglu | 360/266.2 |
| 2006/0182005 A1 * | 8/2006 | Oakley | 369/272.1 |
| 2008/0144208 A1 | 6/2008 | Ward et al. | |
| 2009/0296536 A1 * | 12/2009 | Nagai | 369/13.24 |
| 2010/0208383 A1 | 8/2010 | Breslau et al. | |

OTHER PUBLICATIONS

IBM TDB; IPCOM000013223D; High Performance Disk Drive With Non-Redundant Dual Actuators; Original Publication Date Apr. 1, 2000; IP.com Electronic Publication Jun. 18, 2003; 3 pages.
Office Action (Mail Date Sep. 13, 2011) for U.S. Appl. No. 12/370,672, filed Feb. 13, 2009.
Amendment filed Dec. 7, 2011 in response to Office Action (Mail Date Sep. 13, 2011) for U.S. Appl. No. 12/370,672, filed Feb. 13, 2009.
Notice of Allowance (Mail Date Feb. 16, 2012) for U.S. Appl. No. 12/370,672, filed Feb. 13, 2009.

* cited by examiner

*Primary Examiner* — Thomas Alunkal
(74) *Attorney, Agent, or Firm* — Schmeiser, Olsen & Watts; Anna Linne (57) ABSTRACT

A data storage apparatus and method. The apparatus comprises a mounting structure, a motor mechanically attached to mounting structure, and a data storage platter mechanically attached to the motor. The apparatus additionally comprises a single actuator arm comprising a first and second read/write data head or multiple radial movement mechanisms each comprising a read/write data head. The single actuator arm is configured to move axially along an arc and across a top surface of the data storage platter such that the first read/write data head has access to a first section and a second section of the data storage platter and the second read/write data head only has access to the second section of data storage platter. Each radial movement mechanism moves a different read/write data head radially all along a radius of the data storage platter and over and across different sections of the data storage platter.

20 Claims, 8 Drawing Sheets

DATA STORAGE

This application is a continuation application claiming priority to Ser. No. 12/370,672, filed Feb. 13, 2009.

FIELD

The present invention relates to a method and associated system for accessing various sections of a data storage apparatus.

BACKGROUND

Retrieving information from a device typically comprises a complicated and inefficient process with little flexibility. A user requesting information may not have the ability to quickly locate the information. Accordingly, there exists a need in the art to overcome at least some of the deficiencies and limitations described herein above.

SUMMARY

The present invention provides a data storage apparatus comprising:
a mounting structure;
a first motor mechanically attached to said mounting structure;
a data storage platter mechanically attached to said first motor, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
an actuator motor mechanically attached to said mounting structure;
a single actuator arm mechanically attached to said actuator motor, wherein said single actuator arm is configured to move axially along an arc and across said top surface of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section; and
a control circuit controlling communications to said first read/write data head and said second read/write data head.

The present invention provides a data storage apparatus comprising:
a mounting structure;
a first motor mechanically attached to said mounting structure;
a data storage platter mechanically attached to said first motor, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
a first radial movement mechanism located over said top surface of said data storage platter and mechanically attached to said mounting structure, wherein said first radial movement mechanism comprises a first actuator motor and a first movement assembly;
a first read/write data head mechanically attached to said first radial movement mechanism, wherein said first radial movement mechanism moves said first read/write data head radially along a radius of said data storage platter and across said top surface of said data storage platter such that said first read/write data head has access to only a first section of said data sections;
a second radial movement mechanism located over said top surface of said data storage platter and mechanically attached to said mounting structure, wherein said second radial movement mechanism comprises a second actuator motor and a second movement assembly;
a second read/write data head mechanically attached to said second radial movement mechanism, wherein said second radial movement mechanism moves said second read/write data head radially along said radius of said data storage platter and over and across said top surface of said data storage platter such that said second read/write data head has access to only a second section of said data sections, and wherein said second section differs from said first section; and
a control circuit controlling communications to said first read/write data head and said second read/write data head.

The present invention provides a data access method comprising:
providing a data storage apparatus comprising a mounting structure, a first motor mechanically attached to said mounting structure, a data storage platter mechanically attached to said first motor, an actuator motor mechanically attached to said mounting structure, a single actuator arm mechanically attached to said actuator motor, and a control circuit, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, wherein said spindle portion is located within a center of a rotation portion of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section;
rotating, by said first motor, said data storage platter;
moving axially, by said actuator motor, said single actuator arm along an arc and across said top surface of said data storage platter;
accessing, by said first read/write data head in response to said moving axially, said first section and said second section;
accessing, by said second read/write data head in response to said moving axially, only said second section; and
controlling, by said control circuit, communications to said first read/write data head and said second read/write data head.

The present invention provides a data access method comprising:

providing a data storage apparatus comprising a mounting structure, a first motor mechanically attached to said mounting structure, a data storage platter mechanically attached to said first motor, a first radial movement mechanism, a first read/write data head mechanically attached to said first radial movement mechanism, a second radial movement mechanism, a second read/write data head mechanically attached to said second radial movement mechanism and a control circuit, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, and wherein said spindle portion is located within a center of a rotation portion of said data storage platter;

rotating, by said first motor, said data storage platter;

first moving radially, by said first radial movement mechanism, said first read/write data head along a radius of said data storage platter and across said top surface of said data storage platter;

accessing, by said first read/write data head in response to said first moving radially, only a first section of said data sections;

second moving radially, by said second radial movement mechanism, said second read/write data head along said radius of said data storage platter and across said top surface of said data storage platter;

accessing, by said second read/write data head in response to said second moving radially, only a second section of said data sections, wherein said second section differs from said first section; and controlling, by said control circuit, communications to said first read/write data head and said second read/write data head.

The present invention advantageously provides a simple method and associated system capable of retrieving information from a device.

DETAILED DESCRIPTION

Figure 1:
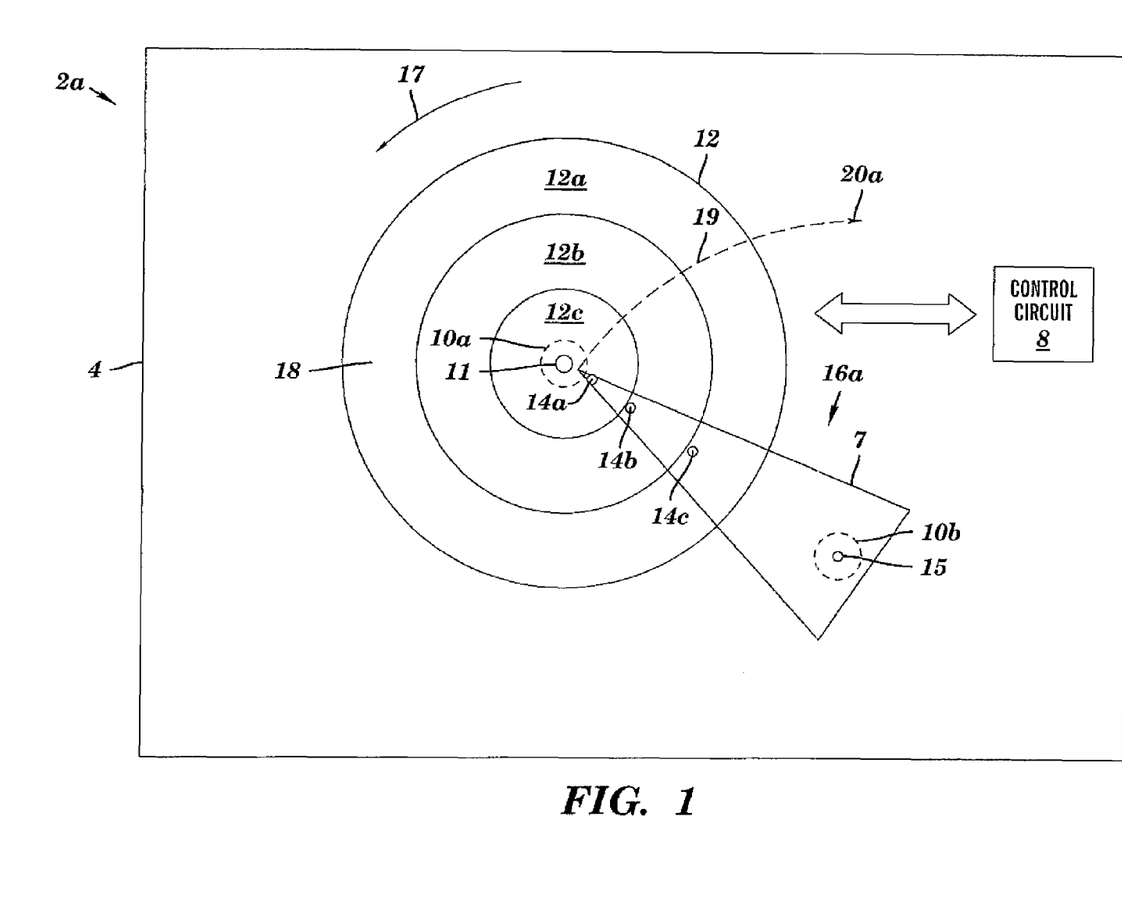
FIG. 1 illustrates a top view of a first data storage apparatus, in accordance with embodiments of the present invention.

FIG. 1 illustrates a top view of a data storage apparatus 2a, in accordance with embodiments of the present invention. Data storage apparatus 2a may comprise any type of data storage apparatus including, inter alia, a magnetic data storage apparatus (e.g., a hard disc drive), an optical data storage apparatus (e.g., a compact disc (CD) drive, a digital video disc (DVD) drive, etc), etc. Data storage apparatus 2a may be connected to a computing system for receiving and transmitting data to and from data storage apparatus 2a. Data storage apparatus 2a comprises a mounting structure 4, a motor 10a mechanically attached to the mounting structure 4, a data storage platter 12 mechanically attached to motor 10a, an actuator motor 10b mechanically attached to mounting structure 4, a single actuator arm 7 mechanically attached to actuator motor 10b, read/write (R/W) data heads 14a, 14b, and 14c mechanically attached to single actuator arm 7, and a control circuit 8 electrically connected to motors 10a and 10b and R/W data heads 14a, 14b, and 14c. Although control circuit 8 is internal to data storage apparatus 2a in FIG. 1, note that control circuit 8 could be place external to data storage apparatus 2a. Actuator motor 10b, single actuator arm 7, and read/write (R/W) data heads 14a, 14b, and 14c are comprised by an axial movement mechanism 16a. Control circuit 8 controls a movement of motors 10a and 10b and communications to and from R/W data heads 14a, 14b, and 14c. Data storage platter 12 may comprise, inter alia, a magnetic disc data storage platter, an optical disc data storage platter, etc. R/W data heads 14a, 14b, and 14c may comprise, inter alia, magnetic R/W data heads, optical R/W data heads, etc. R/W data heads 14a, 14b, and 14c perform a process for writing data to and reading data from data storage platter 12. In order to maximize efficiency and read or write data quickly, R/W data heads 14a, 14b, and 14c have access to different sections 12a, 12b, and 12c of a data storage portion of data storage platter 12. Each of sections 12a, 12b, and 12c may comprise a plurality of tracks each comprising a different portion of data. Data storage platter 12 comprises a data storage portion (i.e., comprising sections 12a, 12b, and 12c) for storing data and a spindle portion 11 attached to motor 10a.

In order to perform a process reading and writing data to and from data storage platter 12, motor 10a spins (i.e., in response to a command from control circuit 8) data storage platter 12 in a direction 17. While data storage platter 12 spins in direction 17, actuator motor 10b moves single actuator arm 7 axially along arc 19 in a direction 20a. Single actuator arm 7 pivots around pivot point 15. Single actuator arm 7 is moved over and across a top surface 18 of data storage platter 12. R/W data head 14a is located on single actuator arm 7 such that R/W data head 14a has access to sections 12a 12b, and 12c of data storage platter 12 (i.e., depending on a position of single actuator arm 7). R/W data head 14b is located on single actuator arm 7 such that R/W data head 14b has access to sections 12a and 12b (but not section 12c) of data storage platter 12 (i.e., depending on a position of single actuator arm 7). R/W data head 14c is located on single actuator arm 7 such that R/W data head 14c has access to section 12a (but not sections 12b and 12c) of data storage platter 12 (i.e., depending on a position of single actuator arm 7). The aforementioned configuration of R/W data heads 14*a*, 14*b*, and 14*c* allow for an efficient read/write process to be performed with respect to reading data from and writing data to data storage platter 12. For example, all of R/W data heads 14*a* . . . 14*c* could be used to read data from section 12*a*, but R/W data head 14*c* could be used to read data from section 12*a* of data platter 12 either with minimal movement or without moving single actuator arm 7 at all. Therefore, it is quicker to use R/W data head 14*c* to read data from section 12*a* than it is to use R/W data heads 14*a* or 14*b*. Additionally, all of R/W data heads 14*a* . . . 14*c* could read data from or write data to data storage platter 12 simultaneously thereby increasing a reading or writing data process over using a single R/W data head. Control circuit 8 controls all communications and data transfer between R/W heads 14*a* . . . 14*c* and a destination or source for the data (e.g., a computer). Control circuit 8 may systematically enable and disable communications to and from R/W data heads 14*a* . . . 14*c* depending on which of R/W data heads 14*a* . . . 14*c* is currently being used. Additionally, control circuit 8 may systematically enable and disable communications to and from R/W data heads 14*a* . . . 14*c* depending on which of R/W data heads 14*a* . . . 14*c* is able to access a selected section of data platter 12 in a fastest time. An algorithm may be executed by control circuit 8 for selecting one of R/W data heads 14*a* . . . 14*c* that will reach a destination on data storage platter 12 in a fastest time (i.e., as compared to the other R/W data heads). The algorithm may calculate an angle or distance of movement in direction 20*a* for single actuator arm 7 such that each of R/W data heads 14*a* . . . 14*c* may reach a specified section (e.g., of sections 12*a* . . . 12*c*) or tracks within sections 12*a* . . . 12*c*. The algorithm may select one of R/W data heads 14*a* . . . 14*c* that comprises a smallest angle or distance of movement in direction 20*a*. The following steps illustrate an algorithm for selecting either R/W data head 14*a* or R/W data head 14*b* (R/W head 14*c* is not used in the following example) for reading or writing data:

1. Calculate an angle at which single actuator arm 7 must move in direction 20*a* so that R/W data head 14*a* may reach each track on data platter 12.
2. Calculate an angle at which single actuator arm 7 must move in direction 20*a* so that R/W data head 14*b* may reach each track on data platter 12.
3. Generate table 1 as follows:

TABLE 1

| Track Number | Angle (in degrees) for R/W data head 14a | Angle (in degrees) for R/W data head 14b |
| --- | --- | --- |
| 0 | 0 | |
| 1 | 2.8125 | |
| 2 | 5.625 | |
| 3 | 8.4375 | |
| 4 | 11.25 | |
| 5 | 14.0625 | |
| 6 | 16.875 | |
| 7 | 19.6875 | |
| 8 | 22.5 | 0 |
| 9 | 25.3125 | 5.625 |
| 10 | 28.125 | 11.25 |
| 11 | 30.9375 | 16.875 |
| 12 | 33.75 | 22.5 |
| 13 | 36.5625 | 28.125 |
| 14 | 39.375 | 33.75 |
| 15 | 42.1875 | 39.375 |
| 16 | 45 | 45 |

4. Generate table 2 (i.e., from table 1) to create a table to angles and the tracks that are accessible by each associated angle.

TABLE 2

| Angle | Track available for R/W data head 14a | Track available for R/W data head 14b |
| --- | --- | --- |
| 0 | 0 | 8 |
| 2.8125 | 1 | |
| 5.625 | 2 | 9 |
| 8.4375 | 3 | |
| 11.25 | 4 | 10 |
| 14.0625 | 5 | |
| 16.875 | 6 | 11 |
| 19.6875 | 7 | |
| 22.5 | 8 | 12 |
| 25.3125 | 9 | |
| 28.125 | 10 | 13 |
| 30.9375 | 11 | |
| 33.75 | 12 | 14 |
| 36.5625 | 13 | |
| 39.375 | 14 | 15 |
| 42.1875 | 15 | |
| 45 | 16 | 16 |

5. When a computer requests information in a specific track, use table 1 to identify which of R/W data heads 14*a* or 14*b* may reach the specific track faster. For example, if the current angle of single actuator arm 7 is 8.4375 and the track requested is number 10, the fastest way to reach the specific track (i.e., track 10) would be to use R/W data head 14*b* which only requires an angle of movement of 2.8125.
6. When the computer requests information that resides in multiple tracks, use table 2 to identify a path that covers all the required tracks and has the least movement for single actuator arm 7. For example, if information is requested from tracks 3, 4, 5, 10, and 11, the following path illustrated in table 3 is used:

TABLE 3

| Angle | Track | R/W data head |
| --- | --- | --- |
| 8.4375 | 3 | 14a |
| 11.25 | 4 | 14a |
| 11.25 | 10 | 14b |
| 14.0625 | 5 | 14a |
| 16.875 | 11 | 14b |

Figure 2:
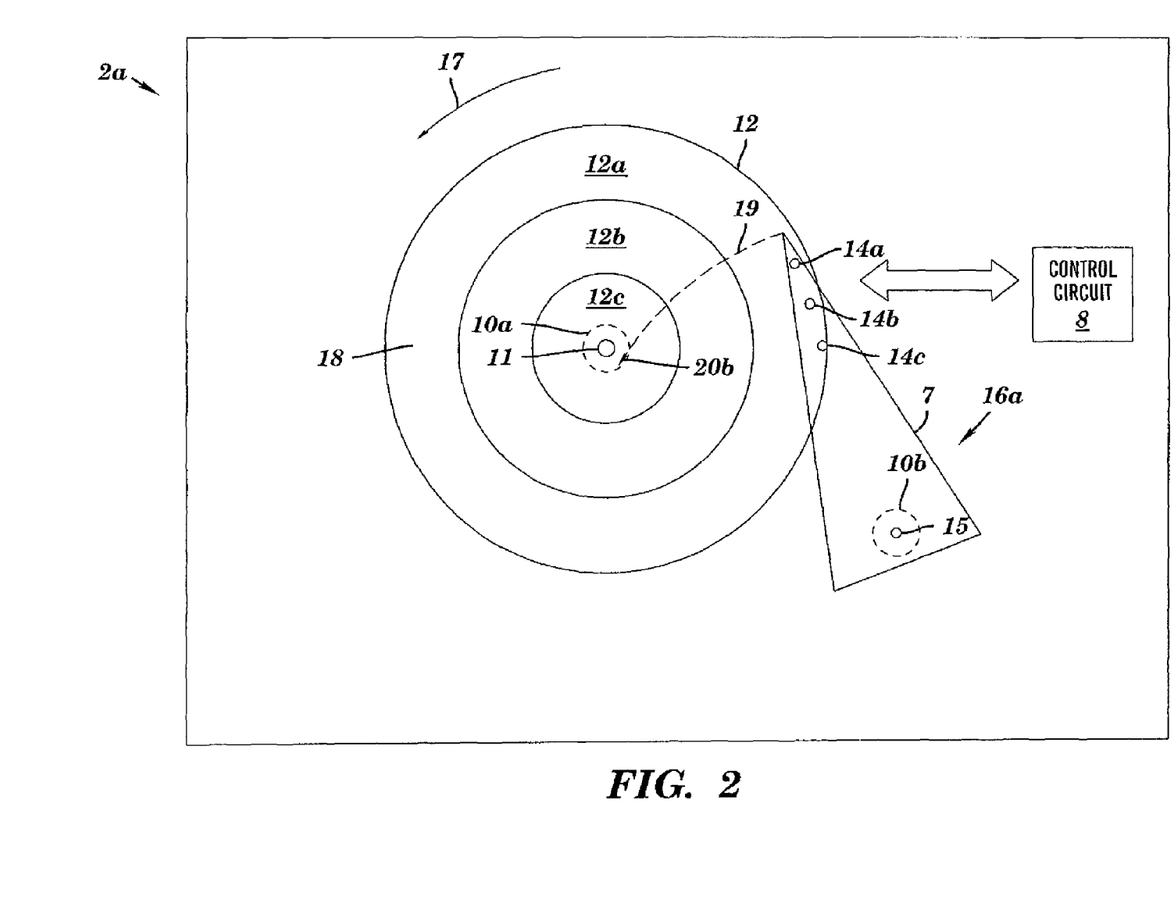
FIG. 2 illustrates an alternate top view of the first data storage apparatus of FIG. 1, in accordance with embodiments of the present invention.

FIG. 2 illustrates a top view of data storage apparatus 2*a* of FIG. 1 after single actuator arm 7 has traveled a specified distance over arc 19 and in direction 20*a*, in accordance with embodiments of the present invention. Additionally, single actuator arm 7 may travel the specified distance in over arc 19 in direction 20*b* to reach a point illustrated in FIG. 1.

Figure 3:
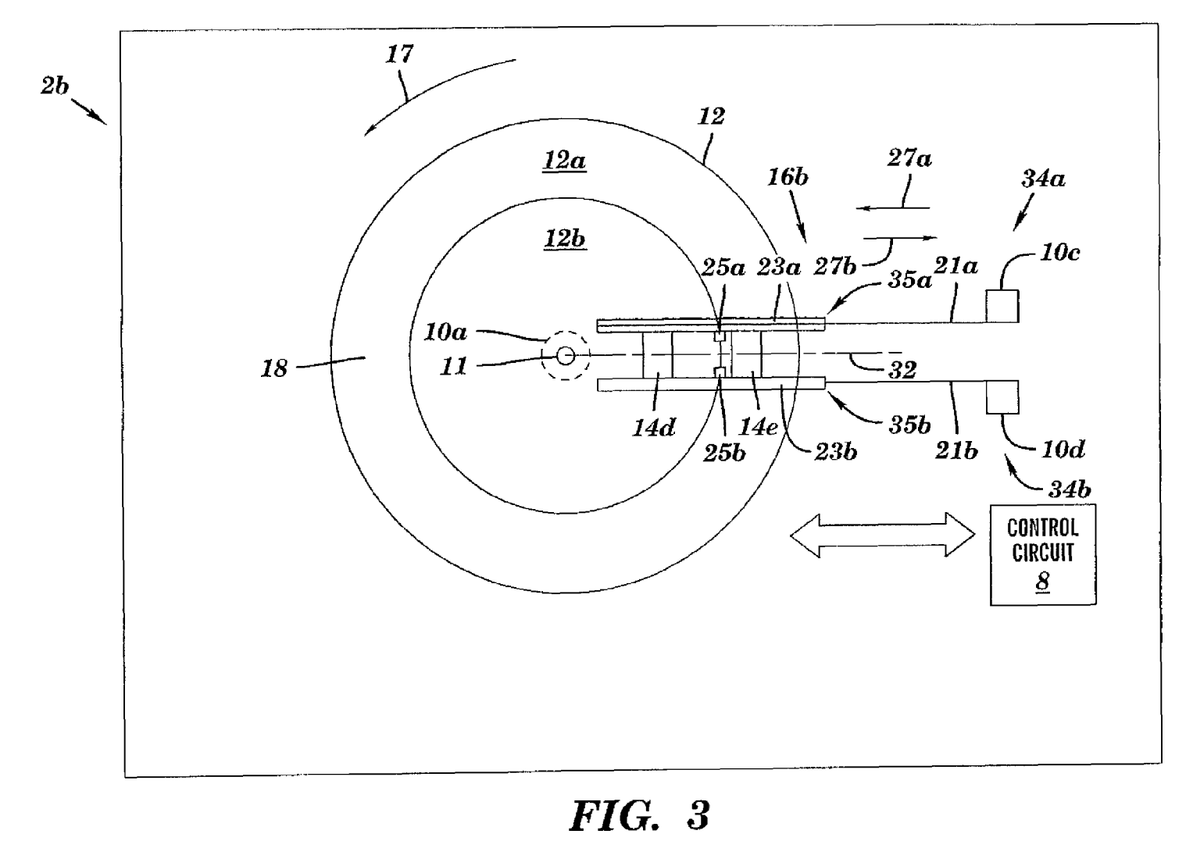
FIG. 3 illustrates a top view of a second data storage apparatus, in accordance with embodiments of the present invention.

FIG. 3 illustrates a top view of an alternative data storage apparatus 2*b* to data storage apparatus 2*a* of FIG. 1, in accordance with embodiments of the present invention. In contrast with data storage apparatus 2*a* of FIG. 1, data storage apparatus 2*b* of FIG. 2 comprises a radial movement assembly 16*b* replacing axial movement mechanism 16*a*. Radial movement assembly 16*b* comprises a radial movement mechanism 34*a*, a radial movement mechanism 34*b*, R/W data head 14*d* mechanically attached to radial movement mechanism 34*a*, and R/W data head 14*e* mechanically attached to radial movement mechanism 34*b*. Radial movement mechanism 34*a* comprises an actuator motor 10*c* and a movement assembly 35*a*. Radial movement mechanism 34*b* comprises an actuator motor 10*d* and a movement assembly 35*b*. Movement assembly 35*a* comprises a rail 23*a*, a stopper 25*a*, and a rigid strip 21*a*. Rigid strip 21*a* is mechanically attached to R/W data head 14*d* and actuator motor 10*c* such that actuator motor 10*c* moves R/W data head 14*d* along radius 32. R/W data head 14d is guided by rail 23a. Movement assembly 35b comprises a rail 23b, a stopper 25b, and a rigid strip 21b. Rigid strip 21b is mechanically attached to R/W data head 14e and actuator motor 10d such that actuator motor 10d moves R/W data head 14e along radius 32. R/W data head 14e is guided by rail 23b.

In order to perform a process for reading and writing data to and from data storage platter 12, motor 10a spins (i.e., in response to a command from control circuit 8) data storage platter 12 in direction 17. While data storage platter 12 spins in direction 17:

1. Radial movement mechanism 34a moves R/W data head 14d radially in direction 27a or 27b, along radius 32 of data storage platter 12, and across top surface 18 of data storage platter 12 such that R/W data head 14d has access to only section 12b of data storage platter 12. Stopper 25a and stopper 25b prevent (i.e., block) R/W data head 14d from reaching section 12a of data platter 12.
2. Radial movement mechanism 34b moves R/W data head 14e radially in direction 27a or 27b, along radius 32 of data storage platter 12, and across top surface 18 of data storage platter 12 such that R/W data head 14e has access to only section 12a of data storage platter 12. Stopper 25a and stopper 25b prevent (i.e., block) R/W data head 14e from reaching section 12b of data platter 12.

The aforementioned configuration of R/W data heads 14d and 14e allow for an efficient read/write process to be performed with respect to reading data from and writing data to data storage platter 12. For example, R/W data head 14d is dedicated to reading data from section 12b and R/W data head 14e is dedicated to reading data from section 12a of data platter 12 thereby reducing a time to reach tracks in each of sections 12a and 12b. Additionally, all R/W data heads 14d and 14e could read data from or write data to data storage platter 12 simultaneously thereby increasing a reading or writing data process over using a single R/W data head. Control circuit 8 controls all communications and data transfer between R/W heads 14d or 14e and a destination or source for the data (e.g., a computer). Control circuit 8 may systematically enable and disable communications to and from R/W data heads 14d and 14e depending on which of R/W data heads 14d and 14e is currently being used. An algorithm may be executed by control circuit 8 for selecting one of R/W data heads 14d or 14e depending on a section of data platter 12 that is selected.

Figure 4:
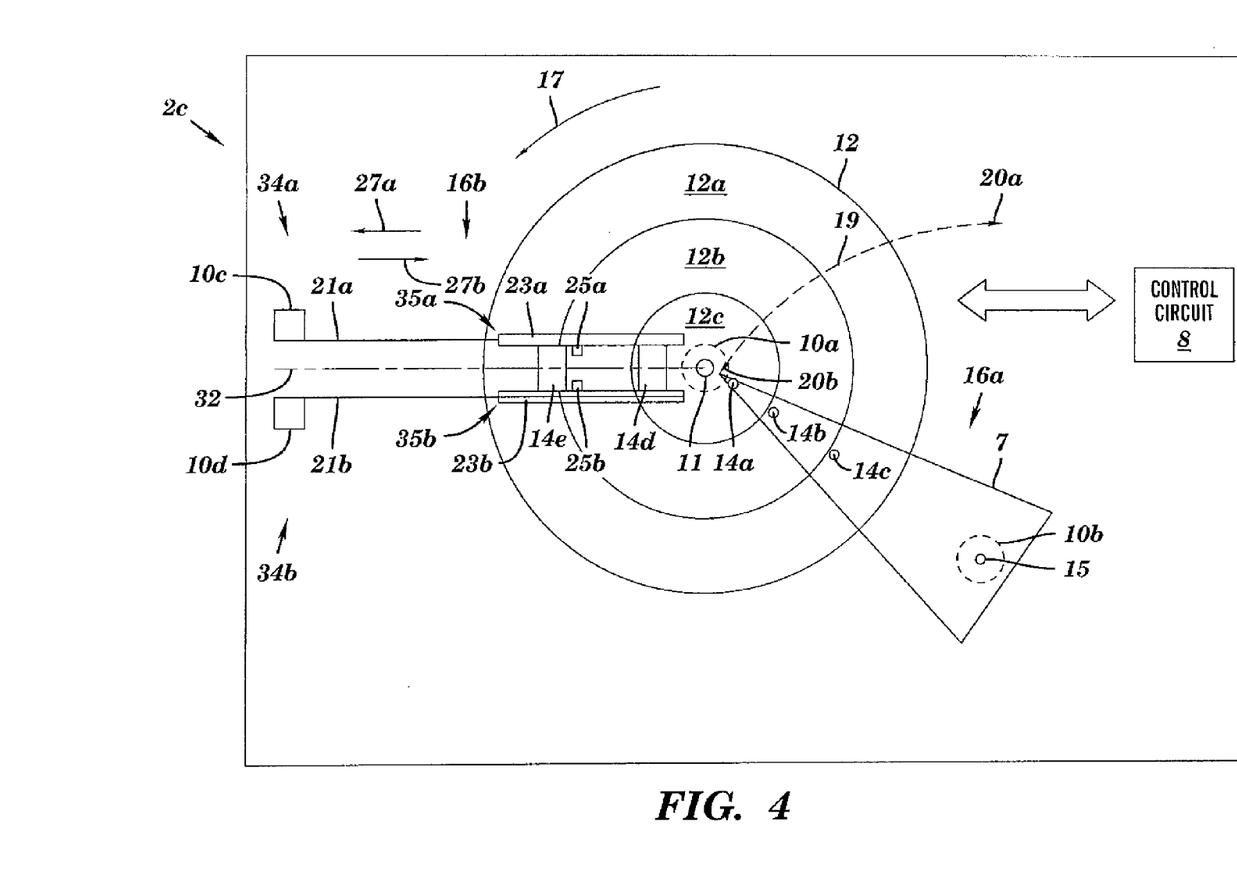
FIG. 4 illustrates a top view of a third data storage apparatus, in accordance with embodiments of the present invention.

FIG. 4 illustrates a top view of a data storage apparatus 2c, in accordance with embodiments of the present invention. Data storage apparatus 2c comprises a combination of data storage apparatus 2a of FIGS. 1 and 2 and data storage apparatus 2b of FIG. 3. Data storage apparatus 2c allows for an efficient read/write process to be performed with respect to reading data from and writing data to data storage platter 12. For example, R/W data heads 14a . . . 14e could read data from or write data to data storage platter 12 simultaneously thereby increasing a reading or writing data process over using a single R/W data head. Control circuit 8 controls all communications and data transfer between R/W heads 14a . . . 14e and a destination or source for the data (e.g., a computer). Control circuit 8 may systematically enable and disable communications to and from R/W data heads 14a . . . 14e depending on which of R/W data heads 14a . . . 14e are currently being used. An algorithm may be executed by control circuit 8 for selecting one of R/W data heads 14a . . . 14e depending on a section(s) of data platter 12 that is selected.

Figure 5:
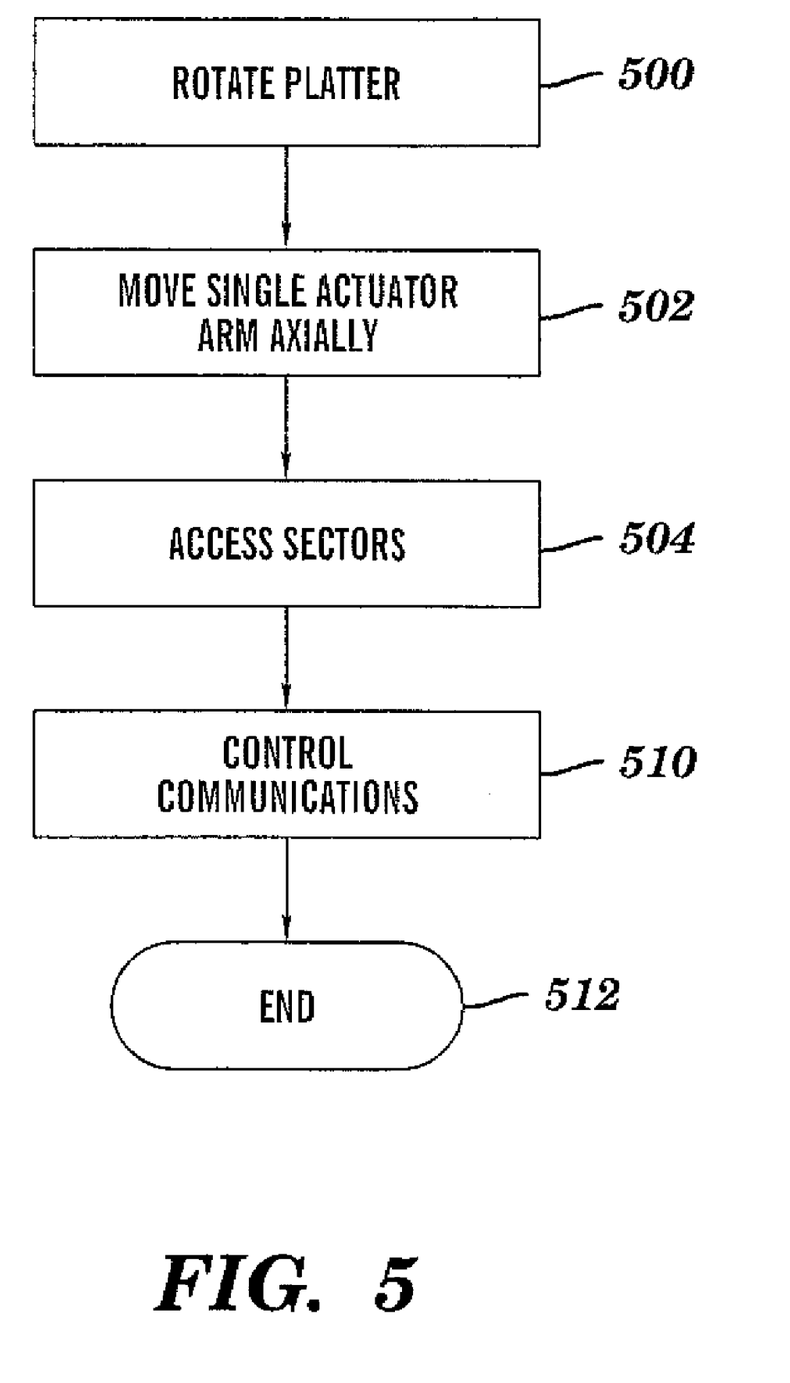
FIG. 5 illustrates a flowchart describing an algorithm used by the first data storage apparatus of FIG. 1 for executing a process for reading and writing data to and from a data storage platter, in accordance with embodiments of the present invention.

FIG. 5 illustrates a flowchart describing an algorithm used by data storage apparatus 2a of FIG. 1 for executing a process for reading and writing data to and from data storage platter 12, in accordance with embodiments of the present invention.

In step 500, data storage platter 12 is rotated. In step 502, single actuator arm 7 is moved axially (i.e., by actuator motor 10b) along arc 19 and across top surface 18 of data storage platter 12. In step 504, R/W data head 14a (i.e., in response to step 502) accesses sections 12a 12b, and 12c of data storage platter 12 (i.e., depending on a position of single actuator arm 7), R/W data head 14b accesses to sections 12a and 12b (i.e., but not section 12c) of data storage platter 12 (i.e., depending on a position of single actuator arm 7), and R/W data head 14c accesses section 12a (i.e., but not sections and 12b and 12c) of data storage platter 12 (i.e., depending on a position of single actuator arm 7). In step 510, control circuit 8 controls all communications and data transfer between R/W heads 14a . . . 14c and a destination or source for the data (e.g., a computer). Control circuit 8 may systematically enable and disable communications to and from R/W data heads 14a . . . 14c depending on which of R/W data heads 14a . . . 14c is currently being used. Additionally, control circuit 8 may systematically enable and disable communications to and from R/W data heads 14a . . . 14c depending on which of R/W data heads 14a . . . 14c is able to access a selected section of data platter 12 in a fastest time. In step 512 the process is terminated.

Figure 6:
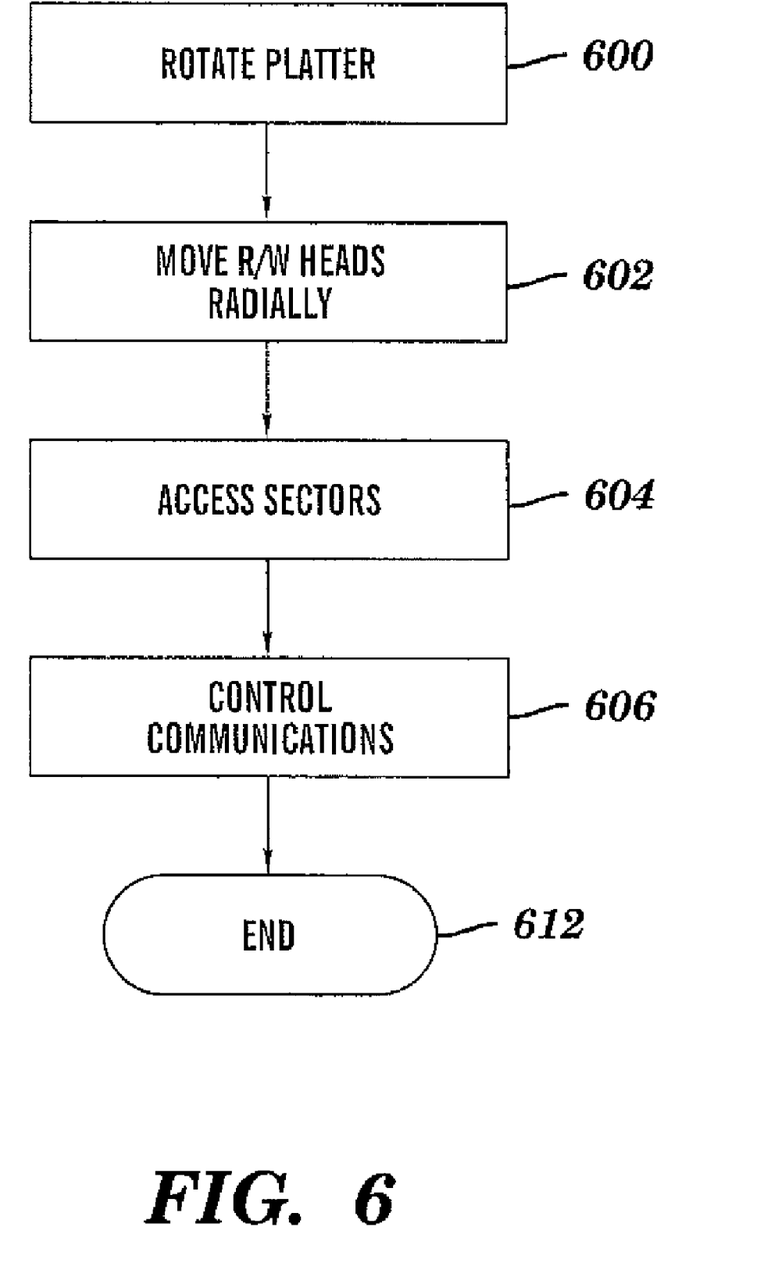
FIG. 6 illustrates a flowchart describing an algorithm used by the second data storage apparatus of FIG. 3 for executing a process for reading and writing data to and from a data storage platter, in accordance with embodiments of the present invention.

FIG. 6 illustrates a flowchart describing an algorithm used by data storage apparatus 2b of FIG. 3 for executing a process for reading and writing data to and from data storage platter 12, in accordance with embodiments of the present invention. In step 600, data storage platter 12 is rotated. In step 602, R/W data head 14d is moved radially (i.e., by radial movement mechanism 35a) in direction 27a or 27b along radius 32 of data storage platter 12 and across top surface 18 of data storage platter 12. Additionally, R/W data head 14e is moved radially (i.e., by radial movement mechanism 35a) in direction 27a or 27b along radius 32 of data storage platter 12 and across top surface 18 of data storage platter 12. In step 604, R/W data head 14d accesses only section 12b of data storage platter 12. Stopper 25a and stopper 25b prevent (i.e., block) R/W data head 14d from reaching section 12a of data platter 12. Additionally, R/W data head 14e accesses only section 12a of data storage platter 12. Stopper 25a and stopper 25b prevent (i.e., block) R/W data head 14e from reaching section 12b of data platter 12. In step 606, control circuit 8 controls all communications and data transfer between R/W heads 14d or 14e and a destination or source for the data (e.g., a computer). Control circuit 8 may systematically enable and disable communications to and from R/W data heads 14d and 14e depending on which of R/W data heads 14d and 14e is currently being used. An algorithm may be executed by control circuit 8 for selecting one of R/W data heads 14d or 14e depending on a section of data platter 12 that is selected. In step 612 the process is terminated.

Figure 7:
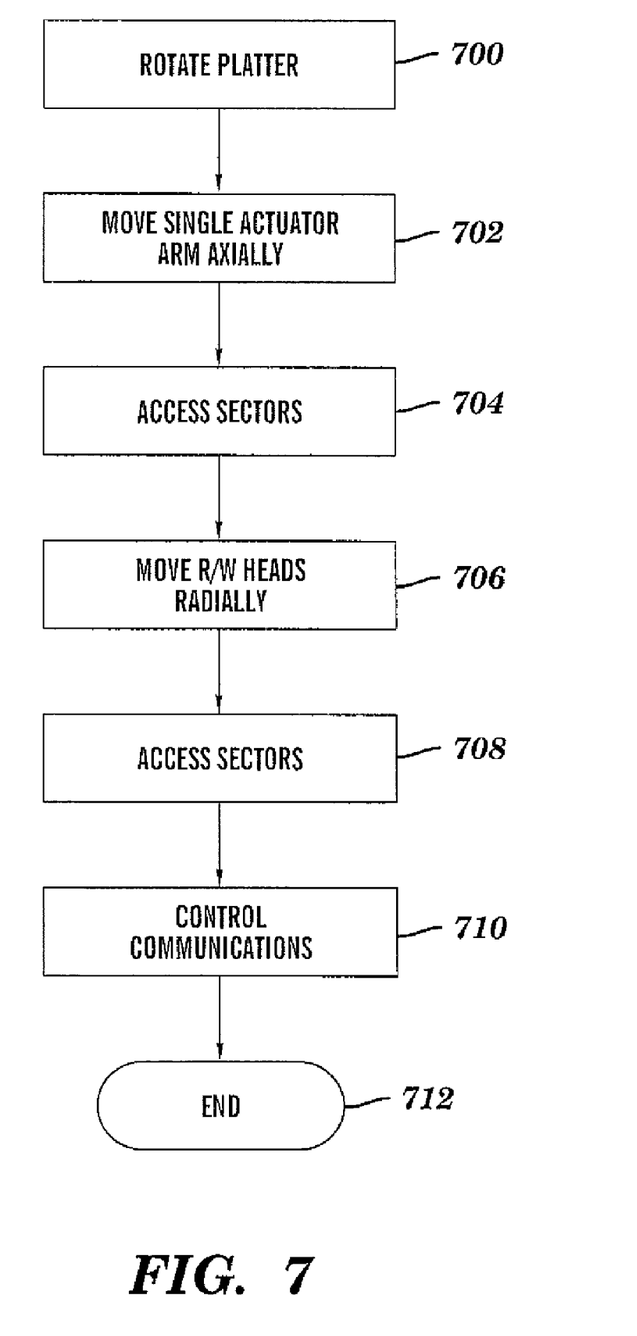
FIG. 7 illustrates a flowchart describing an algorithm used by the third data storage apparatus of FIG. 4 for executing a process for reading and writing data to and from a data storage platter, in accordance with embodiments of the present invention.

FIG. 7 illustrates a flowchart describing an algorithm used by data storage apparatus 2c of FIG. 4 for executing a process for reading and writing data to and from data storage platter 12, in accordance with embodiments of the present invention. In step 700, data storage platter 12 is rotated. In step 702, single actuator arm 7 is moved axially (i.e., by actuator motor 10b) along arc 19 and across top surface 18 of data storage platter 12. In step 704, R/W data head 14a (i.e., in response to step 702) accesses sections 12a 12b, and 12c of data storage platter 12 (i.e., depending on a position of single actuator arm 7), R/W data head 14b accesses to sections 12a and 12b (but not section 12c) of data storage platter 12 (i.e., depending on a position of single actuator arm 7), and R/W data head 14c accesses section 12a (but not sections and 12b and 12c) of data storage platter 12 (i.e., depending on a position of single actuator arm 7). In step 706, R/W data head 14d is moved radially (i.e., by radial movement mechanism 35a) in direction 27a or 27b along radius 32 of data storage platter 12 and across top surface 18 of data storage platter 12. Additionally, R/W data head 14e is moved radially (i.e., by radial movement mechanism 35a) in direction 27a or 27b along radius 32 of data storage platter 12 and across top surface 18 of data storage platter 12. In step 708, R/W data head 14d accesses only section 12b of data storage platter 12. Stopper 25a and stopper 25b prevent (i.e., block) R/W data head 14d from reaching section 12a of data platter 12. Additionally, R/W data head 14e accesses only section 12a of data storage platter 12. Stopper 25a and stopper 25b prevent (i.e., block) R/W data head 14e from reaching section 12b of data platter 12. In step 710, control circuit 8 controls all communications and data transfer between R/W heads 14a . . . 14e and a destination or source for the data (e.g., a computer). Control circuit 8 may systematically enable and disable communications to and from R/W data heads 14a . . . 14e depending on which of R/W data heads 14a . . . 14e are currently being used. An algorithm may be executed by control circuit 8 for selecting one of R/W data heads 14a . . . 14e depending on a section(s) of data platter 12 that is selected. In step 712 the process is terminated.

Figure 8:
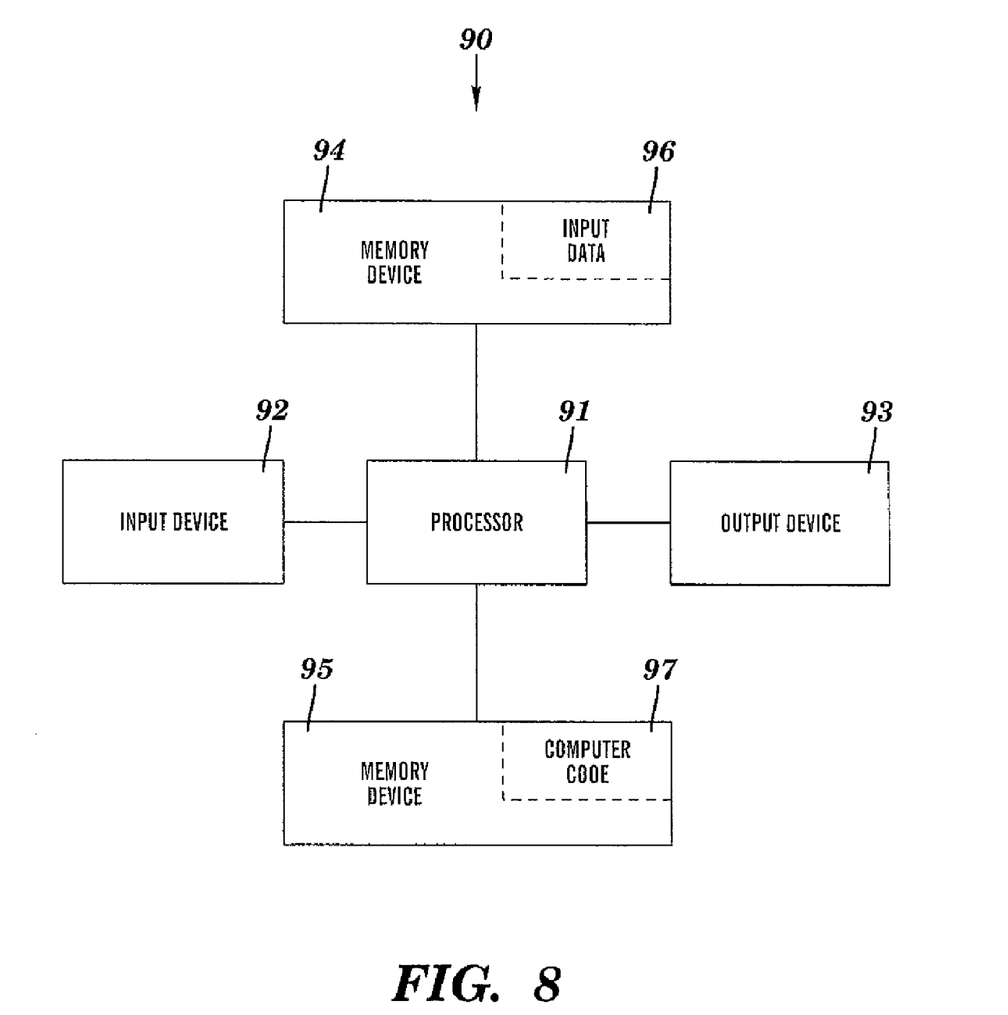
FIG. 8 illustrates a computer apparatus used for executing a process for reading and writing data to and from a data storage platter, in accordance with embodiments of the present invention.

FIG. 8 illustrates a computer apparatus 90 (e.g., control circuit 8 of FIG. 1) used for executing a process for reading and writing data to and from a data storage platter, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5-7) for executing a process for reading and writing data to and from a data storage platter. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithms of FIGS. 5-7 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to execute a process for reading and writing data to and from a data storage platter. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for executing a process for reading and writing data to and from a data storage platter. In another embodiment, the invention provides a business method that performs the process steps of the invention on a subscription, advertising, and/or fee basis. That is, a service provider, such as a Solution Integrator, could offer to execute a process for reading and writing data to and from a data storage platter. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data storage apparatus comprising:
   a mounting structure;
   a data storage unit comprising a data storage platter mechanically attached to a first motor attached to said mounting structure, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
   an actuator motor mechanically attached to said mounting structure;
   a single actuator arm mechanically attached to said actuator motor, wherein said single actuator arm is configured to move axially along an arc and across said top surface of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section; and
   a control circuit controlling communications to said first read/write data head and said second read/write data head, wherein the control circuit is configured to selectively enable or disable communications to said first read/write data head and said second read/write data head in response to detecting which of said first read/write data head or said second read/write data head is currently configured to read data from said data storage platter or write data to said data storage platter, wherein the control circuit is further configured calculate multiple angles of movement in a specified direction for said single actuator arm, wherein said multiple angles of movement are associated with said first read/write data head and said second read/write data head with respect to reaching specified tracks on said data storage platter, wherein the control circuit is further configured to selectively enable or disable communications to said first read/write data head or said second read/write data head in response to a time associated with an angle of said multiple angles, and wherein said angle indicates which of said first read/write data head or said second read/write data head will reach a first track of said specified tracks on said data storage platter first.

2. The data storage apparatus of claim 1, wherein the control circuit is further configured to generate a chart comprising said multiple angles of movement and said specified tracks associated with said first read/write data head and said second read/write data head.

3. The data storage apparatus of claim 1, wherein said single actuator arm further comprises a third read/write data head, wherein said third read/write data head is located on said single actuator arm such that said third read/write data head has access to only a third section and said second section of said data sections, and wherein said first read/write data head has further access to said third section.

4. The data storage apparatus of claim 1, wherein said data storage platter comprises a magnetic data storage medium, and wherein said first read/write data head and said second read/write data head each comprise a magnetic read/write data head.

5. The data storage apparatus of claim 1, wherein said data storage platter comprises an optical data storage medium, and wherein said first read/write data head and said second read/write data head each comprise an optical read/write data head.

6. The data storage apparatus of claim 1, further comprising:
a radial movement mechanism located over said top surface of said data storage platter and mechanically attached to said mounting structure; and
a third read/write data head mechanically attached to said radial movement mechanism, wherein said radial movement mechanism moves said third read/write data head radially along a radius of said data storage platter and across said top surface of said data storage platter such that said third read/write data head has access to said first section and said second section, and wherein said control circuit further controls communications to said third read/write data head.

7. The data storage apparatus of claim 1, wherein said control circuit enables communications to said second read/write data head, and wherein said control circuit disables communications to said first read/write data head.

8. The data storage apparatus of claim 1, wherein said first read/write data head and said second read/write data head are formed coaxially on a single axis extending through a pivot point for said single actuator arm.

9. A data access method comprising:
providing a data storage apparatus comprising a mounting structure, a first motor mechanically attached to said mounting structure, a data storage platter mechanically attached to said first motor, an actuator motor mechanically attached to said mounting structure, a single actuator arm mechanically attached to said actuator motor, and a control circuit, wherein said wherein said data storage platter comprises a data storage portion and a spindle portion, wherein said spindle portion is mechanically attached to a spindle of said first motor, wherein said data storage portion comprises data within a top surface of said data storage platter, wherein said data storage portion comprises sections within said top surface, wherein said spindle portion is located within a center of a rotation portion of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section;
moving axially, by said actuator motor, said single actuator arm along an arc and across said top surface of said data storage platter during rotation of said data storage platter;
accessing, by said first read/write data head in response to said moving axially, said first section and said second section;
accessing, by said second read/write data head in response to said moving axially, only said second section; and
controlling, by said control circuit, communications to said first read/write data head and said second read/write data head, wherein said controlling comprises:
selectively enabling or disabling communications to said first read/write data head and said second read/write data head in response to detecting which of said first read/write data head or said second read/write data head is currently configured to read data from said data storage platter or write data to said data storage platter;
calculating multiple angles of movement in a specified direction for said single actuator arm, wherein said multiple angles of movement are associated with said first read/write data head and said second read/write data head with respect to reaching specified tracks on said data storage platter; and
selectively enabling or disabling communications to said first read/write data head or said second read/write data head in response to a time associated with an angle of said multiple angles, wherein said angle indicates which of said first read/write data head or said second read/write data head will reach a first track of said specified tracks on said data storage platter first.

10. The method of claim 9, wherein said controlling further comprises:
generate a chart comprising said multiple angles of movement and said specified tracks associated with said first read/write data head and said second read/write data head.

11. The method of claim 9, wherein said single actuator arm further comprises a third read/write data head, wherein said third read/write data head is located on said single actuator arm such that said third read/write data head has access to only a third section and said second section of said data sections, and wherein said method further comprises:
accessing, by said third read/write data head in response to said moving axially, said third section and said second section; and
controlling, by said control circuit, communications to said third read/write data head.

12. The method of claim 9, wherein said data storage apparatus further comprises a radial movement mechanism located over said top surface of said data storage platter and mechanically attached to said mounting structure, wherein said radial movement mechanism comprises a third read/write data head mechanically attached to said radial movement mechanism, and wherein said method further comprises:
moving radially, by said radial movement mechanism, said third read/write data head along a radius of said data storage platter and across said top surface of said data storage platter;
accessing, by said third read/write data head in response to said moving radially, said first section and said second section; and
controlling, by said control circuit, communications to said third read/write data head.

13. The method of claim 9, wherein said first read/write data head and said second read/write data head are formed coaxially on a single axis extending through a pivot point for said single actuator arm.

14. The method of claim 9, wherein said data storage platter comprises a magnetic data storage medium, and wherein said first read/write data head and said second read/write data head each comprise a magnetic read/write data head.

15. The method of claim 9, wherein said data storage platter comprises an optical data storage medium, and wherein said first read/write data head and said second read/write data head each comprise an optical read/write data head.

16. A process for supporting computing infrastructure, the process comprising providing at least one support service for at least one of creating, integrating, hosting, maintaining, and deploying computer-readable code stored in a computer comprising a processor, wherein the processor executes instructions contained in the code causing the computer to perform the method of claim 9.

17. A computer program product, comprising a computer readable storage device storing a computer readable program code, said computer readable program code comprising an algorithm that when executed by a computer processor of a data storage apparatus implements a method, said data storage apparatus comprising a mounting structure, a first motor mechanically attached to said mounting structure, a data storage platter mechanically attached to said first motor, an actuator motor mechanically attached to said mounting structure, a single actuator arm mechanically attached to said actuator motor, and a control circuit, said method comprising:
moving axially, by said actuator motor, said single actuator arm along an arc and across a top surface of said data storage platter during rotation of said data storage platter, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, wherein said spindle portion is located within a center of a rotation portion of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section;
accessing, by said first read/write data head in response to said moving axially, said first section and said second section;
accessing, by said second read/write data head in response to said moving axially, only said second section; and
controlling, by said control circuit, communications to said first read/write data head and said second read/write data head, wherein said controlling comprises:
selectively enabling or disabling communications to said first read/write data head and said second read/write data head in response to detecting which of said first read/write data head or said second read/write data head is currently configured to read data from said data storage platter or write data to said data storage platter;
calculating multiple angles of movement in a specified direction for said single actuator arm, wherein said multiple angles of movement are associated with said first read/write data head and said second read/write data head with respect to reaching specified tracks on said data storage platter; and
selectively enabling or disabling communications to said first read/write data head or said second read/write data head in response to a time associated with an angle of said multiple angles, wherein said angle indicates which of said first read/write data head or said second read/write data head will reach a first track of said specified tracks on said data storage platter first.

18. The computer program product of claim 17, wherein said controlling further comprises:
generate a chart comprising said multiple angles of movement and said specified tracks associated with said first read/write data head and said second read/write data head.

19. The computer program product of claim 17, wherein said single actuator arm further comprises a third read/write data head, wherein said third read/write data head is located on said single actuator arm such that said third read/write data head has access to only a third section and said second section of said data sections, and wherein said method further comprises:
accessing, by said third read/write data head in response to said moving axially, said third section and said second section; and
controlling, by said control circuit, communications to said third read/write data head.

20. The computer program product of claim 17, wherein said data storage apparatus further comprises a radial movement mechanism located over said top surface of said data storage platter and mechanically attached to said mounting structure, wherein said radial movement mechanism comprises a third read/write data head mechanically attached to said radial movement mechanism, and wherein said method further comprises:
moving radially, by said radial movement mechanism, said third read/write data head along a radius of said data storage platter and across said top surface of said data storage platter;
accessing, by said third read/write data head in response to said moving radially, said first section and said second section; and
controlling, by said control circuit, communications to said third read/write data head.

* * * * *